United States Patent
Jang (10) Patent No.: US 7,173,670 B2
(45) Date of Patent: Feb. 6, 2007

(54) DEVICE AND METHOD TO DETECT VIDEO FORMAT BASED ON A CYCLICAL PERIOD OF A HORIZONTAL SYNCHRONIZING SIGNAL

(75) Inventor: Seok Ho Jang, Kumi-shi (KR)

(73) Assignee: LG Electronics Inc., Seoul (KR)

( * ) Notice: Subject to any disclaimer, the term of this patent is extended or adjusted under 35 U.S.C. 154(b) by 430 days.

(21) Appl. No.: 10/167,595

(22) Filed: Jun. 13, 2002

(65) Prior Publication Data

US 2003/0007094 A1 Jan. 9, 2003

(30) Foreign Application Priority Data

Jul. 5, 2001 (KR) .......................... 10-2001-40066

(51) Int. Cl.
 *H04N 5/46* (2006.01)
(52) U.S. Cl. ...................................... 348/558; 348/555
(58) Field of Classification Search ................ 348/554, 348/558, 529–531, 540–546, 449, 604; 345/213, 345/3.1, 3.2
See application file for complete search history.

(56) References Cited

U.S. PATENT DOCUMENTS

| | | | |
|---|---|---|---|
| 4,635,099 A * | 1/1987 | Nicholson et al. .......... | 348/555 |
| 4,837,621 A * | 6/1989 | Yug ........................... | 348/558 |
| 4,837,626 A * | 6/1989 | Nishiyama et al. ......... | 348/554 |
| 5,307,165 A * | 4/1994 | Kawashima et al. ........ | 348/441 |
| 5,694,175 A * | 12/1997 | Gaigneux et al. ........... | 348/558 |
| 5,781,185 A * | 7/1998 | Shin ........................... | 345/213 |
| 6,078,361 A * | 6/2000 | Reddy ........................ | 348/558 |
| 6,130,721 A * | 10/2000 | Yoo et al. ................... | 348/558 |
| RE37,551 E * | 2/2002 | Shiki ........................... | 345/87 |
| 6,404,459 B1 * | 6/2002 | Kitou et al. ................. | 348/555 |
| 6,466,272 B1 * | 10/2002 | Arai et al. ................... | 348/555 |
| 6,593,939 B2 * | 7/2003 | Yamada et al. ............. | 345/660 |
| 6,597,404 B1 * | 7/2003 | Moribe et al. .............. | 348/540 |
| 6,798,458 B1 * | 9/2004 | Unemura ..................... | 348/448 |

FOREIGN PATENT DOCUMENTS

CN 1246022 A 3/2000

* cited by examiner

*Primary Examiner*—Victor R. Kostak
(74) *Attorney, Agent, or Firm*—Fleshner & Kim, LLP (57) ABSTRACT

Device and method for processing a signal to a display, the device including a horizontal synchronizing signal detecting part for detecting a horizontal synchronizing signal from a picture signal, and a mode determining part for determining a mode of the picture signal by using a cyclic period of the horizontal synchronizing signal.

26 Claims, 8 Drawing Sheets

| INPUTS | | | OUTPUTS | |
|---|---|---|---|---|
| CLEAR | A | B | Q | Q |
| L | X | X | L | H |
| X | H | X | L | H |
| X | X | L | L | H |
| H | L | ↑ | ⊓ | ⊔ |
| H | ↓ | H | ⊓ | ⊔ |
| ↑ | L | H | ⊓ | ⊔ |

DEVICE AND METHOD TO DETECT VIDEO FORMAT BASED ON A CYCLICAL PERIOD OF A HORIZONTAL SYNCHRONIZING SIGNAL

This application claims the benefit of the Korean Application No. P2001-0040066 filed on Jul. 5, 2001, which is hereby incorporated by reference.

BACKGROUND OF THE INVENTION

1. Field of the Invention

The present invention relates to a display, and more particularly, to device and method for processing a signal to a display.

2. Background of the Related Art

Figure 1:
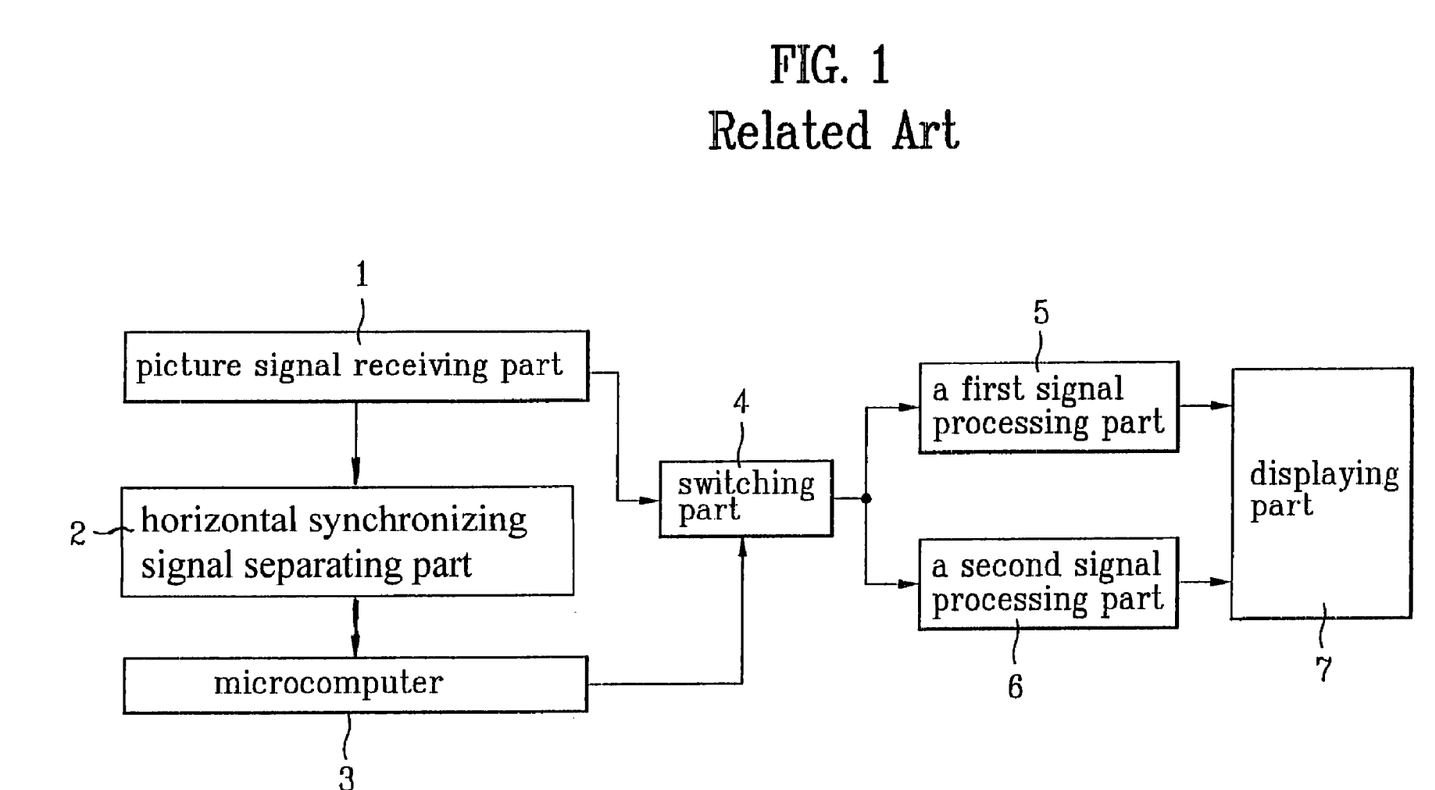
FIG. 1 illustrates a block diagram of a related art device for processing a signal to a display.

Referring to FIG. 1, a related art device for processing a signal to a display is provided with a picture signal receiving part 1 for receiving picture signals of different signal modes, a horizontal synchronizing signal separating part 2 for separating a horizontal synchronizing signal from the picture signal received through the picture signal receiving part 1, a microcomputer 3 for receiving the horizontal synchronizing signal separated at the horizontal synchronizing signal separating part 2, and determining the mode of the picture signal, a switching part 4 for switching the picture signal in response to a control signal of the microcomputer, first, and second signal processing parts 5, and 6 for processing the picture signal in methods different from each other depending on switching of the switching part 4, a displaying part 7 for presenting an output of the first signal processing part or the second signal processing part to a screen.

The operation of the related art device for processing a signal to a display will be explained.

Upon reception of a mode of picture signal through the picture signal receiving part 1, the horizontal synchronizing signal separating part 2 separates the horizontal synchronizing signal from the picture signal, and provides the separated horizontal synchronizing signal to the microcomputer 3. The picture signal may be a picture signal of a 480i (an interlacing scanning type with 480 effective scanning lines) mode, a picture signal of a 480p (a progressive scanning type with 480 effective scanning lines) mode, a picture signal of a 720p (a progressive scanning type with 720 effective scanning lines) mode, or a picture signal of a 1080i (an interlacing scanning type with 1080 effective scanning lines) mode. The microcomputer 3 detects the mode of the picture signal by counting a frequency of the horizontal synchronizing signal. Then the microcomputer 3 provides a switching control signal to the switching part 4 so that the picture signal is provided to the first signal processing part 5 or the second signal processing part 6 depending on the mode.

The first signal processing part 5 processes a 480i picture signal for display on the screen, and the second signal processing part 6 processes a picture signal of 480p, 720p, or 1080i mode for display on the screen.

Then, the displaying part 7 displays the picture signal processed in the first or second signal processing part 5, or 6.

Thus, because the related art device for processing a signal to a display requires to count the frequency of the horizontal synchronizing signal of the picture signal at the microcomputer for determining a mode of the picture signal, the related art device has problems in that the microcomputer has no room for receiving a frequency of the picture signal at a counter thereof, and is overloaded due to frequent interruption of the microcomputer for counting the frequency.

SUMMARY OF THE INVENTION

Accordingly, the present invention is directed to device and method for processing a signal to a display that substantially obviates one or more of the problems due to limitations and disadvantages of the related art.

An object of the present invention is to provide a device and method for processing a signal to a display, which can process a picture signal automatically depending on a mode of the picture signal without overloading a microcomputer or a controlling means of the display.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, at first, a horizontal synchronizing signal is detected from a picture signal. Then, a mode of the picture signal is determined by using a cyclic period of the horizontal synchronizing signal, and the picture signal is processed proper to the determined mode.

In another aspect of the present invention, there is provided a device for processing a signal to a display including a picture signal receiving part for receiving picture signals of different modes, a horizontal synchronizing signal separating part for separating a horizontal synchronizing signal from the picture signal received through the picture signal receiving part, a mode determining part for determining a mode of the picture signal by a cyclic period of the horizontal synchronizing signal, a switching part for switching the picture signal depending on an output signal of the mode determining part, and signal processing parts for processing picture signals depending on switching of the switching part.

In further aspect of the present invention, there is provided a method for processing a signal to a display, comprising the steps of (a) setting at least one time width in advance, (b) receiving one signal mode of a picture signal, (c) detecting a horizontal synchronizing signal from the picture signal, and (d) comparing at least one time width to a cyclic period of the horizontal synchronizing signal, to determine the mode of the picture signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 2:
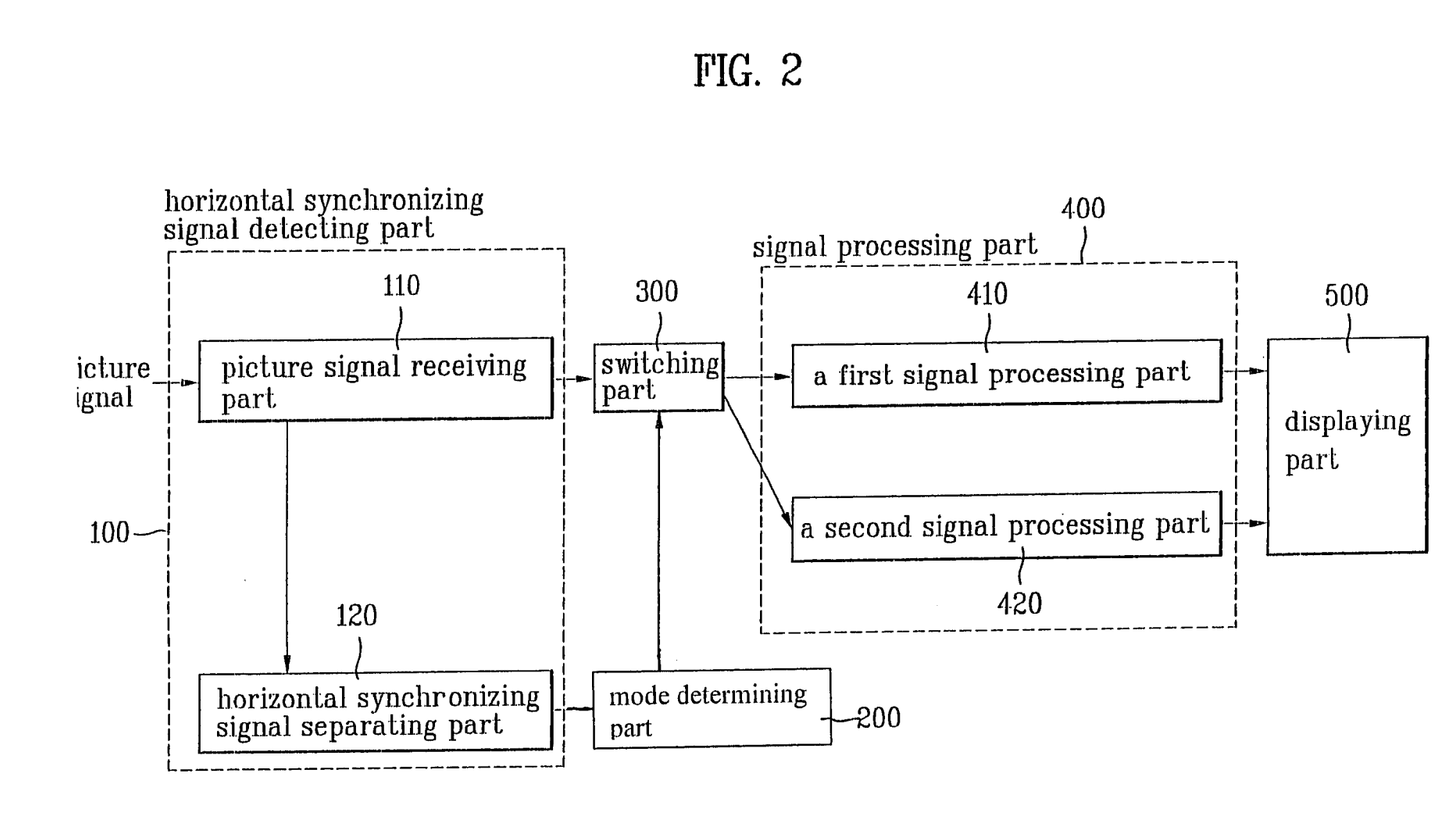
FIG. 2 illustrates a block diagram of a device for processing a signal to a display in accordance with a preferred embodiment of the present invention.
Figure 3:
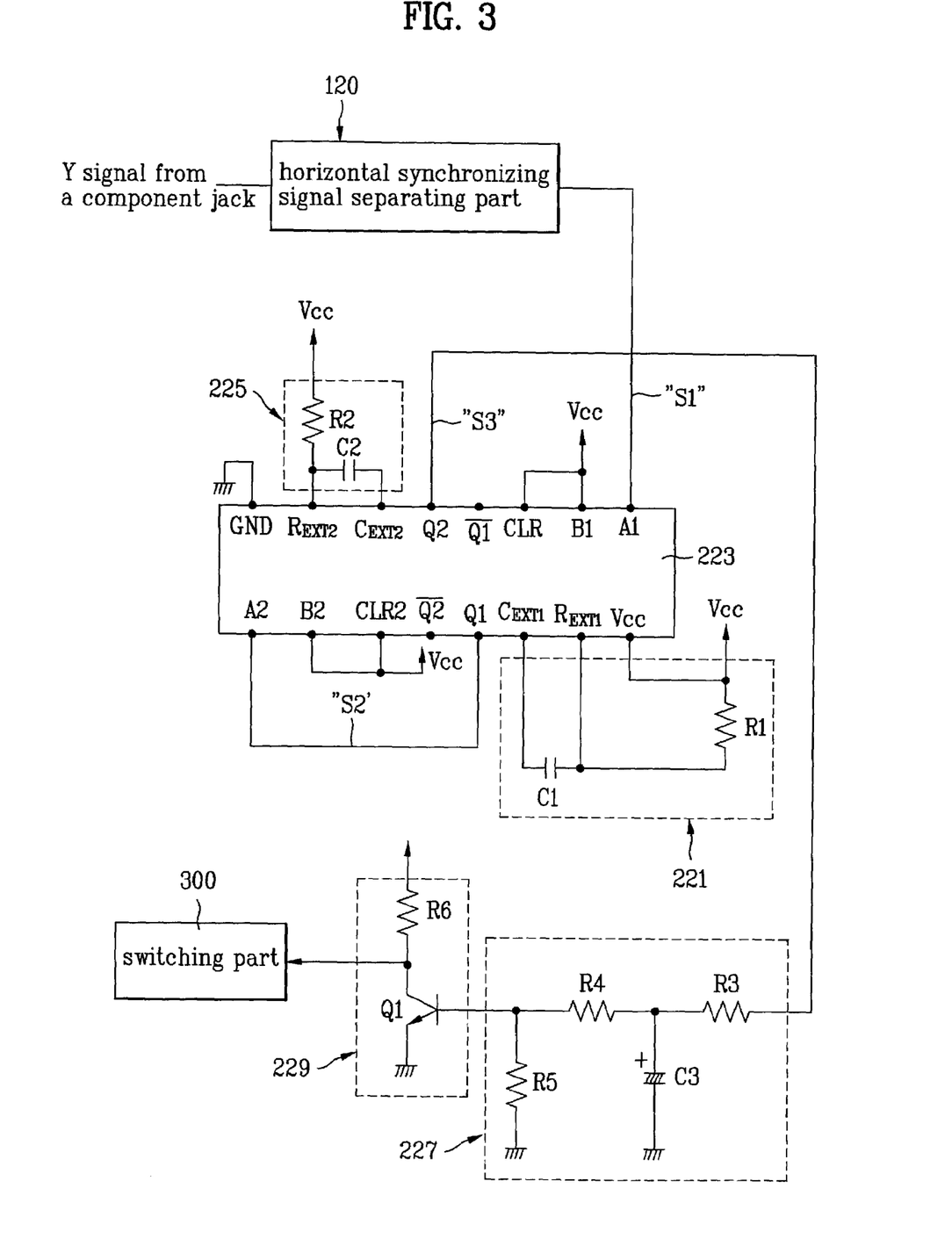
FIG. 3 illustrates a detail of the mode determining part in FIG. 2.
Figure 4:
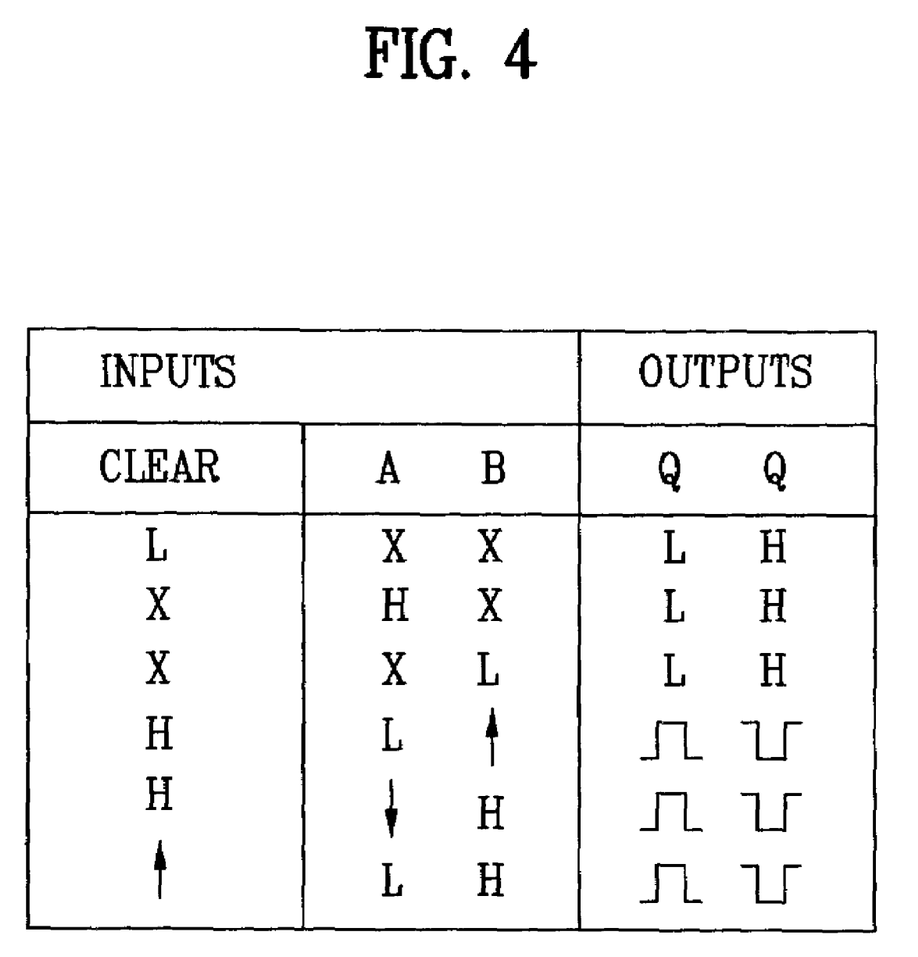
FIG. 4 illustrates a truth table showing signal input/output to/from one shot multivibrator shown in FIG. 3.

Reference will now be made in detail to the preferred embodiments of the present invention, examples of which are illustrated in the accompanying drawings. FIG. 2 illustrates a block diagram of a device for processing a signal to a display in accordance with a preferred embodiment of the present invention, FIG. 3 illustrates a detail of the mode determining part in FIG. 2, FIG. 4 illustrates a truth table showing signal input/output to/from one shot multivibrator shown in FIG. 3. and FIGS. 5A–5D illustrate output waveforms for a received signal.

Referring to FIG. 2, the device for processing a signal to a display in accordance with a preferred embodiment of the present invention includes a horizontal synchronizing signal detecting part 100 for detecting a horizontal synchronizing signal from a received picture signal, a mode determining part 200 for determining a mode of the picture signal by a cyclic period of the horizontal synchronizing signal, a switching part 300 for switching the picture signal depending on an output of the mode determining part 200, and a signal processing part 400 for processing the picture signal by different methods depending on an output of the switching part 300.

The horizontal synchronizing signal detecting part 100 includes a picture signal receiving part 110 for receiving picture signals of different signal modes, and a horizontal synchronizing signal separating part 120 for separating the horizontal synchronizing signal from the picture signal received through the picture signal receiving part 110.

The mode determining part 200 determines the mode of the picture signal by the cyclic period of the horizontal synchronizing signal separated at the horizontal synchronizing signal detecting part 120. The switching part 300 switches the picture signal depending on an output of the mode determining part 200.

Referring to FIG. 3, the mode determining part 200 includes a RC circuit 221 for setting a time width by a time constant of a RC circuit (Resistance-Capacitance Circuit) in advance, an one shot multivibrator 223 connected to the RC circuit 221 for receiving the horizontal synchronizing signal to provide a high or low level signal, another RC circuit 225 connected to the one shot multivibrator 223, a RC integral circuit 227 connected to a final output terminal of the one shot multivibrator 223, a transistor circuit 229 connected to an output terminal of the RC integral circuit 227 for being turned on/off depending on an output of the RC integral circuit 227.

The signal processing part 400 includes first, and second signal processing parts 410, and 420 for processing the picture signal by methods different from each other depending on switching of the switching part.

The operation of the foregoing device for processing a signal to a display of the present invention will be explained.

The horizontal synchronizing signal separating part 120 separates the horizontal synchronizing signal from the picture signal received through the picture signal receiving part 110, and the mode determining part 200 receives the horizontal synchronizing signal, and provides a high or low level signal to the switching part 300 depending on the mode of the picture signal. That is, the mode determining part 200 provides the low level signal when the picture signal has a 480i mode, and the high level signal when the picture signal has 480p, 720p, or 1080i mode, and the switching part receives, and switches the picture signal to the first signal processing part 410 or the second signal processing part 420 depending on an output of the mode determining part.

The operation of the mode determining part 200 having the one shot multivibrator 223 will be explained, with reference to FIGS. 3–5.

Referring to FIG. 3, in the one shot multivibrator 223, 'Q1' terminal provides a high level signal having a time width corresponding to a time constant set by the RC circuit 221 as shown in the fifth case of the truth table in FIG. 4 whenever a falling edge of an 'S1' signal is provided to an 'A1' terminal. When another falling edge is provided to the 'A1' terminal during the maintained high level of the output signal of the 'Q1' terminal, the 'Q1' terminal provides the high level signal with the foregoing time width again from a time the falling edge of the 'S1' signal is provided thereto. Therefore, while the 'Q1' terminal provides the high level signal, if the falling edge is kept to be provided to the 'A1' terminal, the 'Q1' terminal maintains the high level signal, and if the falling edge is stopped to be provided to the 'A1' terminal, the 'Q1' terminal provides the low level signal.

The time width is calculated by substituting $R_{EXT}$ and $C_{EXT}$ of the one shot multivibrator 223 in the following equation (1) with values of the resistor R and the capacitor C.

$$TW = 0.45 \times R_{EXT} \times C_{EXT} \tag{1},$$

Where, TW denotes the time width, and the constant (0.45) varies with types of the one shot multivibrator.

An explanation will now be provided for a case in which the picture signal of the 480i mode is received.

Figure 5A:
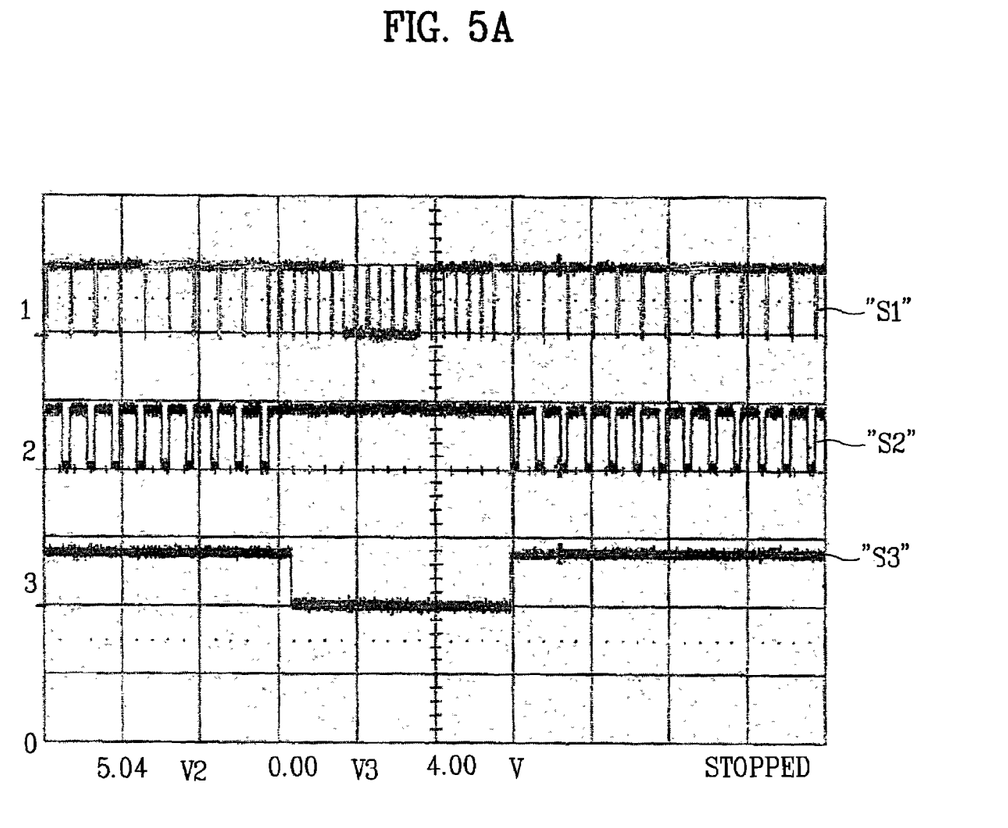
FIG. 5A illustrates line basis input/output waveforms of an one shot multivibrator in FIG. 3 when a picture signal of a 480i mode is received through the picture signal receiving part in FIG. 2.

Referring to FIG. 5A, when an 'S1' signal is provided from the horizontal synchronizing signal separating part 120 to the 'A1' terminal of the one shot multivibrator 223, which is set to have a time width shorter than a horizontal period of a cycle 63.5 µs (15.75 kHz) of the picture signal of 480i mode, and longer than a horizontal period of a cycle 31.75 µs (15.75 kHz) of the picture signal of 480p mode by the time constant of the RC circuit 221, an S2 signal is provided from the 'Q1' terminal of the one shot multivibrator 223.

Figure 5B:
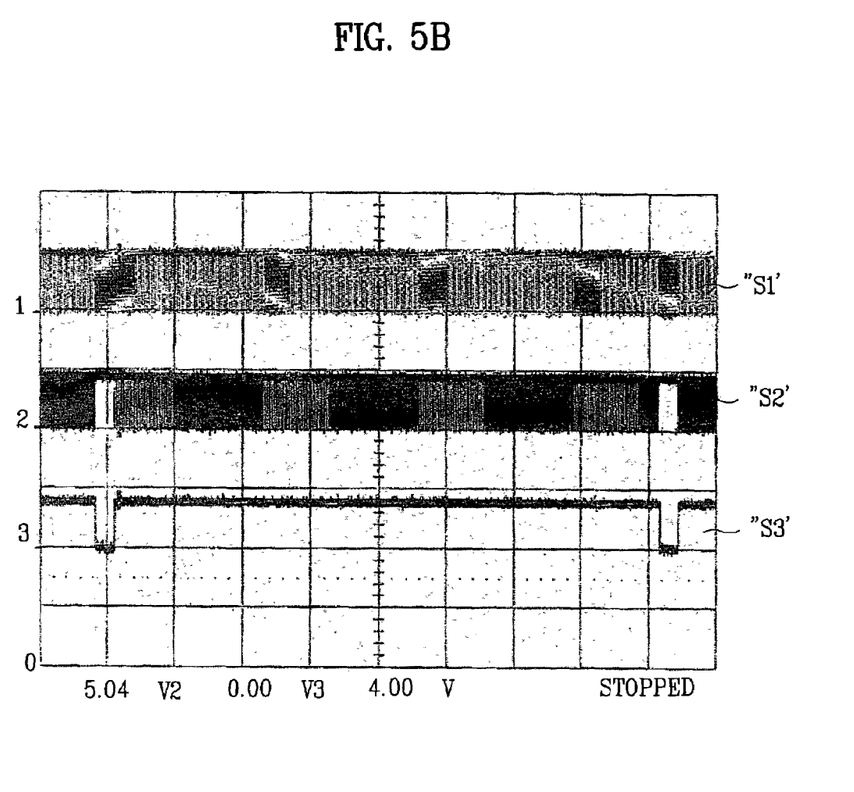
FIG. 5B illustrates field basis input/output waveforms of a one shot multivibrator in FIG. 3 when a picture signal of a 480i mode is received through the picture signal receiving part in FIG. 2.

When the 'S2' signal is provided to the 'A2' terminal of the one shot multivibrator 223, which is set to have a time width longer than a low level time width of the 'S2' signal by the time constant of the RC circuit 225, an 'S3' signal is provided from a 'Q2' terminal of the one shot multivibrator 223. In this instance, since there are equalizing pulses of 31.5 kHz frequency in a vertical retrace line interval of the 480i picture signal, the 'S3' signal is provided in a low level during the vertical retrace line interval.

The 'S3' signal is integrated at the RC integral circuit 227 having a time constant greater than the vertical period of a cycle 16 μs (60 kHz) of the picture signal, and provided to the switching part 300, once the 'S3' signal integrated at the RC integral circuit 227 passes through the transistor circuit 229.

Now, examples of the picture signals of 480p (horizontal frequency 31.5 kHz), 720p (horizontal frequency 45 kHz), and 1080i (horizontal frequency 33.75 kHz) modes being received will now be explained.

Figure 5C:
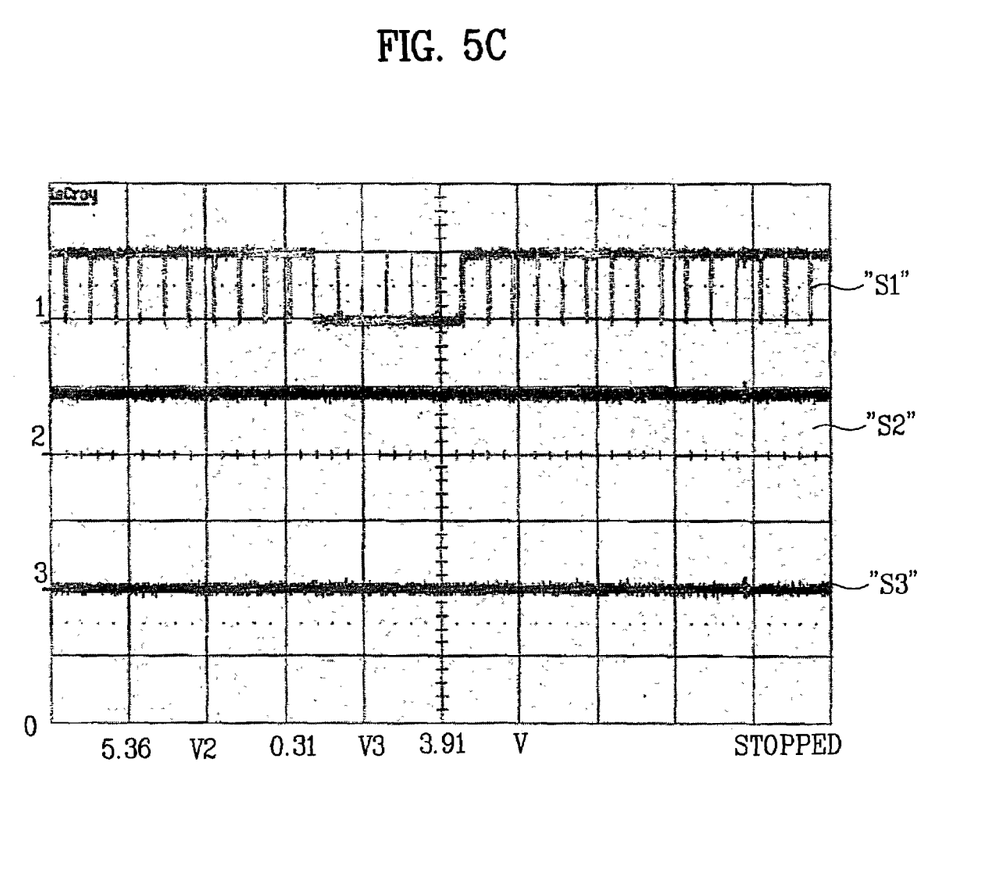
FIG. 5C illustrates line basis input/output waveforms of an one shot multivibrator in FIG. 3 when a picture signal of a 480p, 720p, or 1080i mode is received through the picture signal receiving part in FIG. 2.
Figure 5D:
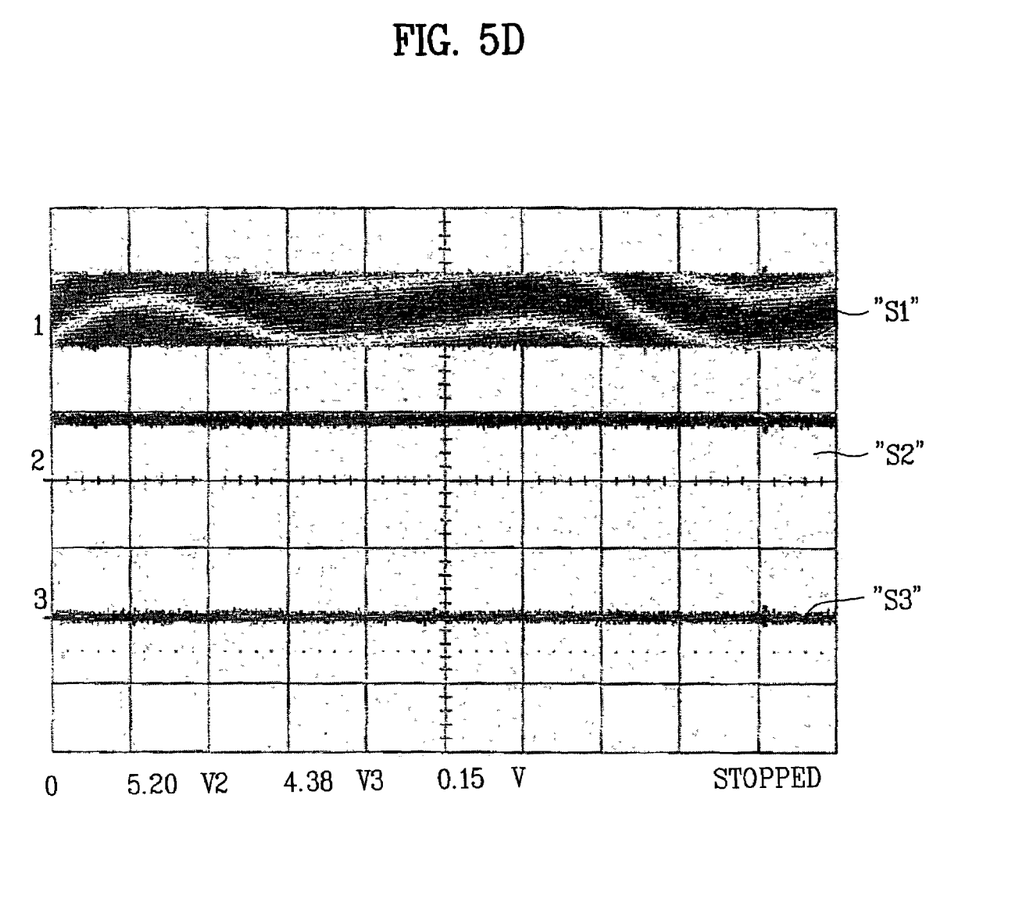
FIG. 5D illustrates field basis input/output waveforms of a one shot multivibrator in FIG. 3 when a picture signal of a 480p, 720p, or 1080i mode is received through the picture signal receiving part in FIG. 2.

Because the horizontal synchronizing signal of the picture signal of 480i, 720p, or 1080i mode has a cyclic period shorter than a time width set by the RC circuit 221, the 'S2' signal is held at a high level as shown in FIGS. 5C and 5D, and, since the 'S2' signal has no falling edge, the 'S3' signal is held at a low level.

The 'S3' signal is involved in removal of noise impulses therein at the RC integral circuit 227, and provided to the switching part 300 as a high level signal, once the 'S3' signal is passed through the transistor circuit 229. According to this, the switching part 300 switches the picture signal depending on the picture signal being at the high level or the low level.

As has been explained, the device for processing a signal to a display can prevent the overload of the microcomputer because a separate simple mode determining part is employed in place of the microcomputer for determining a mode of the picture signal.

It will be apparent to those skilled in the art that various modifications and variations can be made in the device and method for processing a signal to a display of the present invention without departing from the spirit or scope of the invention. Thus, it is intended that the present invention cover the modifications and variations of this invention provided they come within the scope of the appended claims and their equivalents.

What is claimed is:

1. A device for processing a signal to a display comprising:
   a horizontal synchronizing signal detecting part for detecting a horizontal synchronizing signal from a picture signal; and
   a mode determining part for determining a picture signal mode of the picture signal based on a comparison of a cyclic period of the horizontal synchronizing signal and a predetermined time period, the mode determining part providing a first mode determining signal of a first logic level if the picture signal is of 480i, and the mode determining part providing a second mode determining signal of a second logic level if the picture signal is of 480p, 720p or 1080i, the first logic level being different than the second logic signal.

2. A device as claimed in claim 1, wherein the mode determining part includes:
   a device for setting the time period in advance; and
   a device for comparing the predetermined time period with the horizontal synchronizing signal, and determining the picture signal mode of the picture signal based on the comparison.

3. A device as claimed in claim 2, wherein the device for setting the time period includes at least one RC circuit for setting the time period in advance by a time constant.

4. A device as claimed in claim 2, wherein the device for determining the mode of the picture signal includes a one shot multivibrator for providing a logical level signal by using the time period and the cyclic period of the horizontal synchronizing signal, the logical level signal being the mode determining signal.

5. A device as claimed in claim 1, wherein the mode comprises one of a plurality of standard picture signal modes.

6. A device as claimed in claim 1, wherein the predetermined time period is preset based on widths of horizontal signals from at least two modes.

7. A device for processing a signal to a display comprising:
   a picture signal receiving part for receiving one mode of a picture signal;
   a horizontal synchronizing signal separating part for separating a horizontal synchronizing signal from the picture signal received through the picture signal receiving part;
   a mode determining part for determining a picture signal mode of the picture signal by comparing a predetermined time period and a cyclic period of the horizontal synchronizing signal separated at the horizontal synchronizing signal separating part, the mode determining part providing a first mode determining signal of a first logic level if the picture signal is of 480i, and the mode determining part providing a second mode determining signal of a second logic level if the picture signal is of 480p, 720p or 1080i, the first logic level being different than the second logic level;
   at least two signal processing parts for processing picture signals of modes different from each other; and
   a switching part for switching the picture signal to either one of the signal processing parts depending on an output mode determining signal of the mode determining part.

8. A device as claimed in claim 7, further comprising a displaying part for displaying the picture signal processed by one of the at least two signal processing parts on a screen.

9. A device as claimed in claim 7, wherein the mode determining part includes:
   a device for setting a time period in advance; and
   a device for comparing the time period with the horizontal synchronizing signal, and determining the mode of the picture signal based on the comparison.

10. A device as claimed in claim 9, wherein the device for setting the time period includes at least one RC circuit for setting the time period in advance by a time constant.

11. A device as claimed in claim 9, wherein the device for determining the mode of the picture signal includes a one shot multivibrator for providing a logical level signal by using the time period and the cyclic period of the horizontal synchronizing signal, the logical level signal being the mode determining signal.

12. A device as claimed in claim 7, wherein the mode comprises one of a plurality of standard picture signal modes.

13. A device as claimed in claim 7, wherein the time period is preset based on widths of horizontal signals from at least two modes.

14. A method for processing a signal to a display, comprising:
   setting a time period in advance;
   receiving one mode of a picture signal;
   separating a horizontal synchronizing signal from the picture signal;
   comparing the time period to a cyclic period of the horizontal synchronizing signal, to determine a picture signal mode of the picture signal; and providing a first mode determining signal of a first logic level if the picture signal is a 480i type, and providing a second mode determining signal of a second logic level if the picture signal is a 480p, 720p or 1080i type, wherein the first logic level is different than the second logic level.

15. A method as claimed in claim 14, further comprising subjecting the picture signal to one of a plurality of processes different from each other depending on the mode of the picture signal for displaying the picture signal.

16. A method as claimed in claim 14, wherein the mode comprises one of a plurality of standard picture signal modes.

17. A method as claimed in claim 14, wherein the comparing includes determining the mode based on a comparison of the horizontal synchronizing signal and the time period.

18. A method as claimed in claim 17, wherein the time period is preset based on widths of horizontal signals from at least two modes.

19. A device for processing a signal to be displayed, the device comprising:
   a horizontal synchronizing signal detecting part for detecting a horizontal synchronizing signal from a picture signal; and
   a mode determining part for determining a picture signal mode of the picture signal based on a comparison between a cyclic period of the detected horizontal synchronizing signal and a predetermined time period, said mode determining part outputting a first mode determining signal of a first logic level if the picture signal is of a first type and outputting a second mode determining signal of a second logic level if the picture signal is of a second type,
      wherein the first type of picture signal is a picture signal having a horizontal synchronizing signal of a cyclic period shorter than the predetermined time period and wherein the second type of picture signal is a picture signal having a horizontal synchronizing signal of a cyclic period longer than the predetermined time period.

20. A device as claimed in claim 19, wherein each of the first type of picture signal and the second type of picture signal corresponds to a standard picture signal mode.

21. A device as claimed in claim 19, wherein the predetermined time period corresponds to a time width set according to a time constant of an RC circuit.

22. A device as claimed in claim 19, wherein the predetermined time period is preset based on widths of horizontal synchronizing signals from at least two picture signal modes.

23. A method for processing a signal to be displayed, the method comprising:
   presetting a time period;
   receiving a picture signal;
   separating a horizontal synchronizing signal from the received picture signal;
   comparing the preset time period to a cyclic period of the separated horizontal synchronizing signal;
   determining, based on said comparing, a picture signal mode of the received picture signal; and
   generating, based on said comparing, one of a first mode determining signal of a first logic level if the picture signal is of a first type and a second mode determining signal of a second logic level if the picture signal is of a second type,
      wherein the first type of picture signal is a picture signal having a horizontal synchronizing signal of a cyclic period shorter than the preset time period and wherein the second type of picture signal is a picture signal having a horizontal synchronizing signal of a cyclic period longer than the preset time period.

24. A method as claimed in claim 23, wherein each of the first type of picture signal and the second type of picture signal corresponds to a standard picture signal mode.

25. A method as claimed in claim 23, wherein the preset time period corresponds to a time width set according to a time constant of an RC circuit.

26. A method as claimed in claim 25, wherein the set time width is based on widths of horizontal synchronizing signals from at least two picture signal modes.

* * * * *